United States Patent [19]

Ishii et al.

[11] Patent Number: 4,747,042

[45] Date of Patent: May 24, 1988

[54] DISPLAY CONTROL SYSTEM

[75] Inventors: Takatoshi Ishii, Tokyo; Ryozo Yamashita, Kawasaki; Kazuhiko Nishi, Kobe, all of Japan

[73] Assignee: Ascii Corporation, Tokyo, Japan

[21] Appl. No.: 683,696

[22] Filed: Dec. 19, 1984

[30] Foreign Application Priority Data

Dec. 20, 1983 [JP] Japan ................................ 58-240727
Mar. 29, 1984 [JP] Japan ................................ 59-59642

[51] Int. Cl.[4] ................................ G06F 3/14

[52] U.S. Cl. ................................ 364/200; 364/518; 364/521

[58] Field of Search ... 364/200 MS File, 900 MS File, 364/518, 521, 520; 340/723, 724, 725, 726, 740, 747, 749, 750, 789, 807; 382/44, 45, 46, 47

[56] References Cited

U.S. PATENT DOCUMENTS

| | | | |
|---|---|---|---|
| 3,471,848 | 10/1969 | Manber | 340/750 |
| 3,691,551 | 9/1972 | Kashio | 340/740 |
| 3,793,483 | 2/1974 | Bushnell | 340/725 |
| 3,938,130 | 2/1976 | Burnham et al. | 340/740 |
| 3,952,297 | 4/1976 | Stauffer et al. | 340/740 |
| 4,026,555 | 5/1977 | Kirschner et al. | 340/725 |
| 4,028,724 | 6/1977 | Graham | 340/724 |
| 4,070,710 | 1/1978 | Sukonick et al. | 364/900 |
| 4,149,164 | 4/1979 | Reins et al. | 340/701 |
| 4,181,956 | 1/1980 | Schwab et al. | 364/521 |
| 4,200,866 | 4/1980 | Strathman | 340/703 |
| 4,303,986 | 12/1981 | Lans | 364/900 |
| 4,319,339 | 3/1982 | Utzerath | 364/900 |
| 4,367,466 | 1/1983 | Takeda et al. | 340/725 |
| 4,511,962 | 4/1985 | Machida et al. | 364/200 |
| 4,545,068 | 10/1985 | Tabata et al. | 382/41 |
| 4,631,750 | 12/1986 | Gabriel et al. | 382/41 |

*Primary Examiner*—Gareth D. Shaw
*Assistant Examiner*—Kevin A. Kriess
*Attorney, Agent, or Firm*—Koda and Androlia

[57] ABSTRACT

An improved display control system for use in a computer is disclosed which is equipped with functions of X, Y addressing and area movement so as to reduce the execution time necessary for display operations of the computer. Also, in this display control system, means for executing line commands is composed of the hardware so as to reduce the execution time necessary for display operations on the line commands.

5 Claims, 9 Drawing Sheets

FIG. 5

| REGISTER NO. | 7 (MSB) | | | | | | | 0 (LSB) | |
|---|---|---|---|---|---|---|---|---|---|
| #32 | $X_7$ | $X_6$ | $X_5$ | $X_4$ | $X_3$ | $X_2$ | $X_1$ | $X_0$ | SXL ( SOURCE X LOW ) |
| #33 | 0 | 0 | 0 | 0 | 0 | 0 | 0 | $X_8$ | SXH ( SOURCE X HIGH) |
| #34 | $Y_7$ | $Y_6$ | $Y_5$ | $Y_4$ | $Y_3$ | $Y_2$ | $Y_1$ | $Y_0$ | SYL ( SOURCE Y LOW ) |
| #35 | 0 | 0 | 0 | 0 | 0 | 0 | $Y_9$ | $Y_8$ | SYH ( SOURCE Y HIGH ) |
| #36 | $X_7$ | $X_6$ | $X_5$ | $X_4$ | $X_3$ | $X_2$ | $X_1$ | $X_0$ | DXL (DESTINATION X LOW ) |
| #37 | 0 | 0 | 0 | 0 | 0 | 0 | 0 | $X_8$ | DXH (DESTINATION X HIGH) |
| #38 | $Y_7$ | $Y_6$ | $Y_5$ | $Y_4$ | $Y_3$ | $Y_2$ | $Y_1$ | $Y_0$ | DYL (DESTINATION Y LOW) |
| #39 | * | * | * | * | * | * | $Y_9$ | $Y_8$ | DYH (DESTINATION Y HIGH) |
| #40 | $NX_7$ | $NX_6$ | $NX_5$ | $NX_4$ | $NX_3$ | $NX_2$ | $NX_1$ | $NX_0$ | NXL ( DOT NUMBER X LOW) |
| #41 | 0 | 0 | 0 | 0 | 0 | 0 | $NX_9$ | $NX_8$ | NXH ( DOT NUMBER X HIGH) |
| #42 | $NY_7$ | $NY_6$ | $NY_5$ | $NY_4$ | $NY_3$ | $NY_2$ | $NY_1$ | $NY_0$ | NYL ( DOT NUMBER Y LOW) |

FIG. 7

| CMR $CM_3$ $CM_2$ $CM_1$ $CM_0$ | MNEMONIC CODE | DESTI-NATION | SOURCE | TRANSFER UNIT | |
|---|---|---|---|---|---|
| 1 1 1 1 | HMMC | VRAM | CPU | BYTE | HIGH SPEED TRANSFER |
| 1 1 1 0 | HMCM | CPU | VRAM | BYTE | HIGH SPEED TRANSFER |
| 1 1 0 1 | HMMM | VRAM | VRAM | BYTE | HIGH SPEED TRANSFER |
| 1 1 0 0 | HMMV | VRAM | VDC | BYTE | HIGH SPEED TRANSFER |
| 1 0 1 1 | LMMC | VRAM | CPU | DOT | LOGICAL TRANSFER |
| 1 0 1 0 | LMCM | CPU | VRAM | DOT | LOGICAL TRANSFER |
| 1 0 0 1 | LMMM | VRAM | VRAM | DOT | LOGICAL TRANSFER |
| 1 0 0 0 | LMMV | VRAM | VDO | DOT | LOGICAL TRANSFER |
| 0 1 1 1 | LINE | VRAM | VDC | DOT | LINE COMMAND |
| 0 1 1 0 | SRCH | VDC | VRAM | DOT | SEARCH COMMAND |
| 0 1 0 1 | PSET | VRAM | VDC | DOT | P SET COMMAND |
| 0 1 0 0 | PINT | VDC | VRAM | DOT | POINT COMMAND |

FIG. 8

| CMR $LO_3$ $LO_2$ $LO_1$ $LO_0$ | MNEMONIC CODE | OPERATION |
|---|---|---|
| 0 0 0 0 | IMP | SC → DC |
| 0 0 0 1 | AND | SC * DC → DC |
| 0 0 1 0 | OR | SC + DC → DC |
| 0 0 1 1 | EOR | SC ⊕ DC → DC |
| 0 1 0 1 | NOT | $\overline{SC}$ → DC |
| 1 0 0 0 | TIMP | IF SC=0, THEN DC → DC, OTHERWISE IMP |
| 1 0 0 1 | TAND | IF SC=0, THEN DC → DC, OTHERWISE AND |
| 1 0 1 0 | TOR | IF SC=0, THEN DC → DC, OTHERWISE OR |
| 1 0 1 1 | TEOR | IF SC=0, THEN DC → DC, OTHERWISE EOR |
| 1 1 0 0 | TNOT | IF SC=0, THEN DC → DC, OTHERWISE NOT |

DISPLAY CONTROL SYSTEM

BACKGROUND OF THE INVENTION

1. Field of the Invention

The present invention relates to an improved display control system for a computer.

2. Description of the Prior Art

FIG. 1 illustrates a block diagram of a conventional color graphics display system.

In this figure, there is provided a CPU(microprocessor) 1 for controlling the whole system, to which a main memory 2 and a display control circuit 3 are connected. The main memory 2 is used to hold programs and data, while the display control circuit 3 is dedicated to controlling color graphics display. In FIG. 1, reference numeral 4 designates a VRAM (video memory) to hold data for CRT display, and numeral 5 represents a CRT color display unit.

FIG. 2 illustrates a block diagram of an example of the display control circuit 3 shown in FIG. 1.

A clock signal generated by a timing controller 11 is input to a counter 12 which comprises a column counter, a line counter and a row counter. The counter 12 generates a CRT display synchronous signal via a display timing circuit 13, while it also creates a display address and outputs it as a VRAM address via a multiplexer 15.

The read data for display access from the VRAM 4 is inputted via a buffer 19 to a video output controller 20 to create a CRT video signal.

On the other hand, when CPU 1 accesses VRAM 4, the address of VRAM 4 is set in a VRAM address register 14. Then, if a write strobe is input to a CPU interface controller 18, then Multiplexer 15 selects the output of the VRAM address register 14 to be accessed by CPU 1 as a VRAM address, and the write data from CPU 1 is written into VRAM 4 via the buffers 16, 17.

FIG. 3 illustrates an example of the above-mentioned VRAM 4. The illustrated VRAM 4 has a series of physical addresses as a memory unit, and, logically, it has a such a display screen structure as shown which comprises 640 horizontal dots, 200 vertical dots and 4-bit color information (16 colors).

Now let us consider an operational example: that is, an operation in which on the display screen shown in FIG. 3 the block data of the source area in VRAM 4 is transferred to a destination area based on the X, Y coordinates.

CPU 1 calculates the physical address of VRAM 4 based on the coordinates (Sx, Sy) of the source area and sets it in the VRAM address register 14 within the display control circuit 3. CPU 1 also outputs a read command and reads out the color data in VRAM 4 which corresponds to the coordinates (Sx, Sy).

Next, CPU 1 calculates a physical address in VRAM 4 based on the coordinates (Dx, Dy) of a destination area to which the block data is to be transferred, and sets it in the VRAM address register 14 within the display control circuit 3. CPU 1 also outputs the color data and write command and writes them into VRAM 4 corresponding to the coordinates (Dx, Dy).

Thus, the above-mentioned read/write procedure must be repeated NX times regarding a horizontal direction and NY times regarding a vertical direction, that is, $(NX \times NY)$ times to be able to transfer the block data of the source area to the destination area.

As can be understood from the foregoing description, the conventional display control system for a personal computer is designed to have reduced amounts of hardware on its internal structure and interfaces such as gates and IC elements so as to satisfy the needs for a compact computer and for reduced costs. This increases the load of software accordingly.

A figure forming processing includes a line command which provides the start coordinates (DXo, DYo) of a straight line to be formed, as well as the amounts of displacement in both the X-coordinate direction (horizontal direction) and Y-coordinate direction (vertical direction) of the straight line so as to form the straight line. To execute the line command, not only the calculation of the coordinates of the line but also a logical operation between the line coordinates and the color code data on the picture being now displayed are necessary.

FIG. 3A is a view to explain the execution of the above-mentioned line command. We will now consider an example of operation of a line command to form a line from the start coordinates (DXo, DYo), on the display screen shown in FIG. 3A.

First, CPU 1 calculates the physical address of VRAM 4 from the start coordinates (DXo, DYo) and sets the calculated physical address in the VRAM address register 14 within the display control circuit 3. Also, CPU 1 outputs a read command and reads out the color code data within VRAM 4 corresponding to the start coordinates (DXo, DYo). Further, CPU 1 performs a logical operation between the read-out color code data and a predetermined type of data to create new color code data on a straight line.

The color code data on a line created is written by a write command into the locations of VRAM 4 correspond-ing to the start coordinates (DXo, DYo).

Next, CPU 1 carries out a coordinate calculation to obtain the coordinates (DX1, DY1) of the second dot forming a line to be formed. Then, in a similar operation, the color code data on the line is written into VRAM 4. Next, the coordinates (DX2, DY2) of the third dot are calculated and the associated color code data is written into VRAM 4. In this manner, the above-mentioned operation can be sequentially repeated NX times to form the line on the screen.

As can be seen from the example of the above-mentioned block data transfer, in the conventional display control system, all of the processings must be performed by CPU 1 and thus it takes a lot of time to transfer the block data.

On the other hand, normally, CPU 1 and the display control circuit 3 are operated independently of each other and the display timing of the display control circuit 3 is given a higher priority than the VRAM access timing of CPU 1. Thus, a wait time occurs in access to VRAM 4 from CPU 1, which decrease the performance of the data transfer extremely.

Accordingly, in the above-mentioned prior art display control system, since its software must play a greater role in display control, there is a problem that it takes a very long time to execute its display control operation. Also, when a computer is up-graded with increased display specifications and a plurality of display modes, the address calculation is further complicated and thus the time necessary for execution of its operation is outstandingly extended.

In addition, in the prior art display control system, since, as can be understood from the above-mentioned example of operation of the conventional line command, all of the processings must be performed by CPU 1 and thus extremely much time is required for the read/write of the color code data, coordinates calculation and physical address calculation, there exists a problem that the processing performance of the line command is low.

SUMMARY OF THE INVENTION

Accordingly, it is an object of the invention to provide an improved display control system for a computer which can reduce the execution time for display operation.

It is another object of the invention to provide an improved display control system for a computer which can reduce the time necessary for execution of the display operation on a line command.

In order to accomplish these objects, the display control system of the invention is equipped with functions of addressing X, Y coordinates as well as of area movement. The interface procedure for this purpose is determined in a soft-oriented manner.

The foregoing and other related objects and features of the invention will be more apparent from a reading of the following description of the disclosure found in the accompanying drawings and the novelty thereof pointed out in the appended claims.

BRIEF DESCRIPTION OF THE DRAWINGS

FIGS. 5, 6 and 6A are views to show the contents the respective registers employed in the above-mentioned embodiment of the invention, respectively;

FIG. 7 is a view to illustrate a command code employed in the above embodiment of the invention;

FIG. 8 is a view to illustrate a logical operation employed in the invention.

DETAILED DESCRIPTION OF A PREFERRED EMBODIMENT OF THE INVENTION

Figure 4:
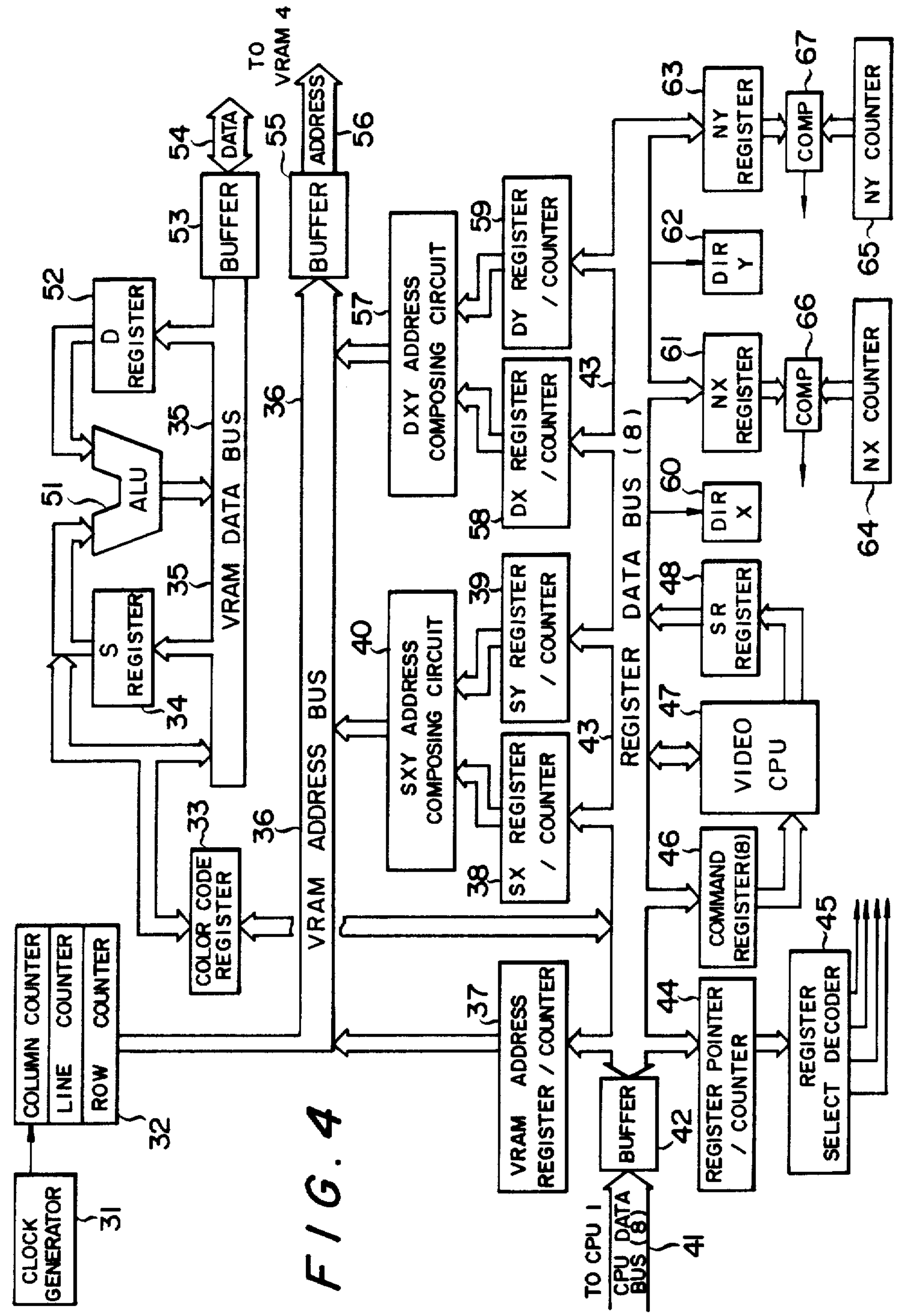
FIG. 4 is a block diagram of an embodiment of the invention.

FIG. 4 illustrates a block diagram of an embodiment of the invention.

In this embodiment, there is provided a clock generator 31 for generating a display timing clock, and there is also provided a counter 32 which comprises a column counter, a line counter, and a row counter and is adapted to generate a CRT screen display timing and a VRAM address in accordance with the display timing clock.

Data bus 41 from CPU 1 is connected via a buffer 42 to a register data bus 43. To specify individual addresses, the number of registers within a display control circuit 3 to be accessed by CPU 1 is held by a register pointer/counter 44, and the output of the register pointer/counter 44 is decoded by a register selector decoder 45. This register counter/pointer 44 has a count-up function in addition to a register function. That is, in setting parameters for the respective registers, after completion of such parameter setting the register pointer/counter 44 counts up by one. Therefore, the registers can be successively specified one after another automatically.

The command information from CPU 1 is held by a command register 46, and a video CPU 47 performs processings on the display data according to the commands from CPU 1. The status from the video CPU 47 to CPU 1 is to be held by an SR register 48. Also, the video CPU 47 incorporates an operation register ACC therein and is able to perform necessary operation processings according to the commands. When CPU 1 specifies the physical address of VRAM 4 and accesses the VRAM 4, a VRAM address register/counter 37 holds the VRAM address. A color code register 33 holds the write data to VRAM 4 and the read data from VRAM 4.

The features of the invention include the below-mentioned components:

That is to say, first, there are provided an SX register/counter 38 to hold values on the X coordinate in a horizontal direction of a source area, an SY register/-counter 39 to hold values on the Y coordinate in a vertical direction, and an SXY address composing circuit 40 to create the physical address of VRAM 4 in accordance with the respective outputs of the SX, SY register/counter 38, 39.

Also, in the present invention, there are provided a DX register/counter 58 to hold values on the X coordinate in a horizontal direction of a destination area, a DY register/counter 59 to hold values on the Y coordinate in a vertical direction, and a DXY address synthetic circuit 57 to create the physical address of VRAM 4 in accordance with the respective outputs of the DX, DY registers/counters 58, 59.

The above-mentioned SX, SY, DX, and DY registers/counters 38, 39, 58, and 59 have an up/down counter function as well as a register function, respectively.

Further, within the display control circuit 3 there are provided a VRAM address bus 36 connected via a buffer 55 to an address line 56 of VRAM 4, and a VRAM data bus 35 connected via a buffer 53 to a VRAM data line 54.

NX register 61 is used to hold the number of transfer data in a horizontal direction (X coordinate direction), and NY register 63 is dedicated to holding the number of transfer data in a vertical direction (Y coordinate direction). A horizontal direction X flag 60 indicates a positive direction (right direction) when it is "0", and a negative direction (left direction) for "1". A vertical direction Y flat 62 points out a positive direction (downward direction) when it is "0", and a negative direction (upward direction) for "1". S register 34 is used to hold the read data from the source area, while D register 52 is dedicated to the read data from the destination area. ALU(Arithmetic and Logical Unit) 51 performs the logical operations of the outputs of S register 34, color code register 33 and D register 52, such as IMP, AND, OR, EOR, NOT operations.

When figures are formed, DX register/counter 58 holds values on the X coordinate in a horizontal direction of a straight line to be formed, DY register/counter 59 holds values on the Y coordinate in a vertical direction of the line, NY register 61 holds the amount of displacement in a horizontal direction of the line (X coordinate direction of the line) from the start coordinates (DXo, DYo) thereof, and NY register 63 holds the amount of displacement in a vertical direction (Y coordinate direction) of the line from the start coordinates (DXo, DYo) thereof.

The above-mentioned components are the characteristic ones of the invention. Although other components than the foregoings exist within the display control circuit 3, such components as not specially required in describing the operation of the invention are not explained here.

Next, we will describe the operation of the above-mentioned embodiment of the invention.

First, we will explain the operation of the display control circuit 3, by way of example, with reference to the transfer of the block data using X, Y coordinates.

It is necessary that CPU 1 has previously set information required for transfer of the block data in the respective registers. When accessing each of the registers, CPU 1 sets the number of the register to be accessed first in the register pointer/counter 44 before it performs its read/write operations on a series of data.

Figure 1:
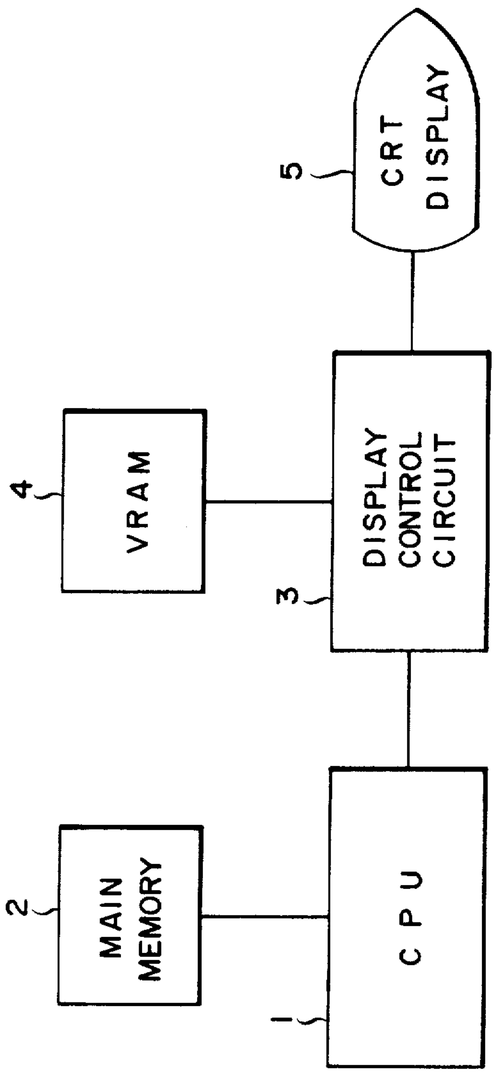
FIG. 1 PRIOR ART
FIG. 1 is a block diagram of a conventional, typical color display systems.
Figure 2:
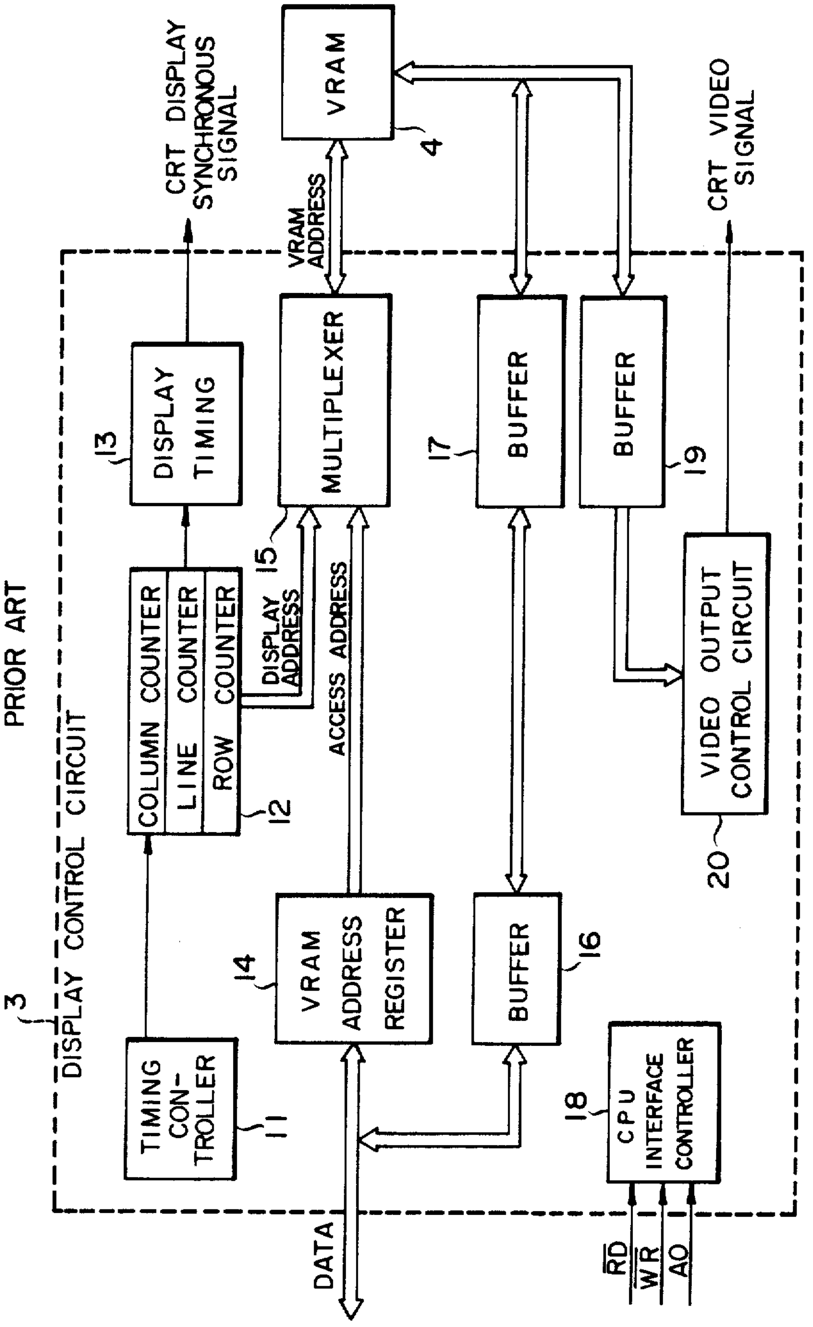
FIG. 2 PRIOR ART
FIG. 2 is a block diagram of a display control circuit employed in the color display system shown in FIG. 1.
Figure 3:
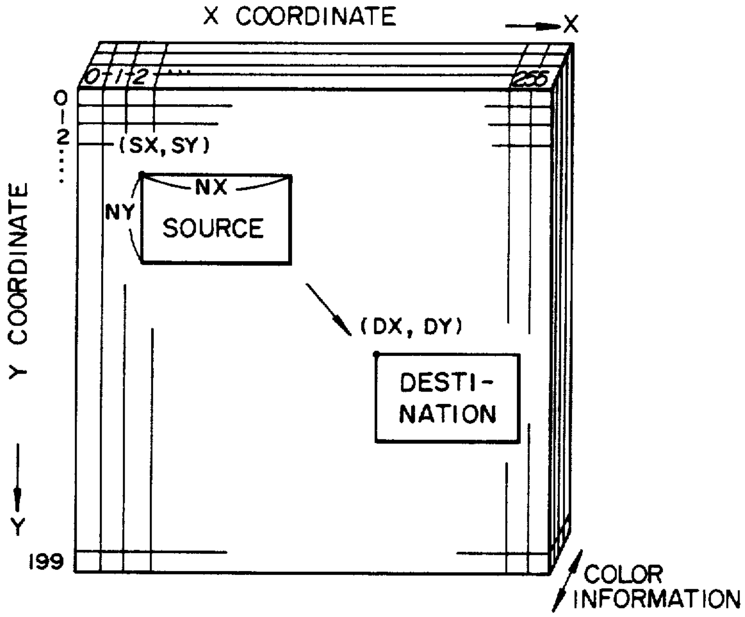
FIG. 3 is a block diagram of a VRAM employed in the color display system shown in FIG. 1, illustrating the transfer operation of block data.

When such transfer of the block data as shown in FIG. 3 is performed, the start coordinates (SX, SY) of the source area are set in SX register/counter 38 and SY register/counter 39. SX register/counter 38 comprises SXL(register #32) and SXH(register #33), while SY register/counter 39 is composed of SYL(register #34) and SYH(register #35). Therefore, CPU 1 sets 4-byte parameters on the starting point of transfer, i.e., on the start coordinates (SX, SY).

Figure 6:
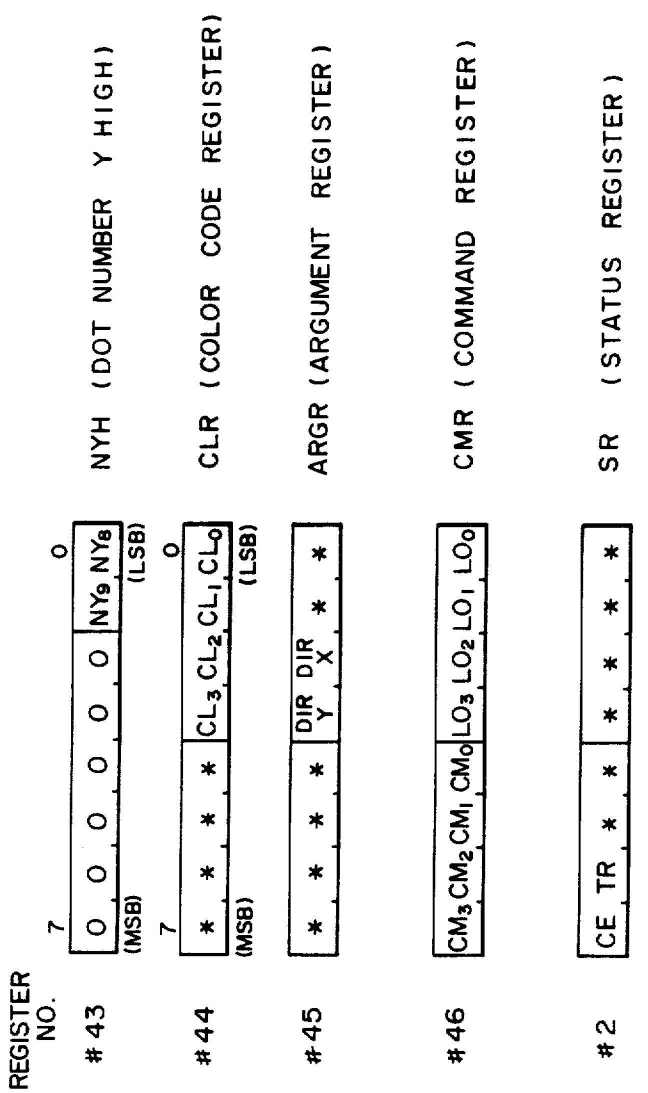

Now, FIG. 5 illustrates the contents of the registers 32–42, while FIG. 6 illustrates the contents of the registers 43–46 and the register #2.

Next, the start coordinates (DX, SY) of the destination area are set in SX register/counter 58 and DY register/counter 59. DX register/counter 58 is composed of DXL (register #36) and DXH (register #37), while DY register/counter 59 is composed of DYL (register #38) and DYH (register #39).

Then, the number of data to be transferred in a horizontal direction (X coordinate direction), namely, NX is set in in NX register 61, and the number of data to be transferred in a vertical direction (Y coordinate direction), namely, NY is set in NY register 63. NX register 61 comprises NXL (register #40) and NXH (register #41), while NY register 63 comprises NYL (register #42) and NYH (register #43).

Since the block data to be transferred is in a positive direction in both of their X, Y directions when viewed from the start coordinates (SX, SY), "0" is set in Direction X Flag 60 and Direction Y Flag 62, respectively. Direction X Flag 60 corresponds to the bit 3 of an arguement register ARGR (register #45), while Direction Y Flat 62 corresponds to the bit 2 of the argu-ment register ARGR (register #45). Now, the execution of the foregoing settings completes the setting of the parameters necessary to transfer the block data. The above-mentioned parameter setting continues from the register #32 to the register #45. At first, "32" is set in the register pointer/counter 44. Thereafter, only by writing the parameter data successively, the associated registers can be set sequentially. After then, the register pointer/counter 44 points out #46 and waits for the setting of a command code.

Now, FIG. 7 shows a table to illustrate the contents of the command codes employed in the invention. In this figure, "VDC" designates the display control circuit 3.

FIG. 8 is a table to show the contents of the logical operations employed in the invention. In this figure, SC represents a source color code, and DC stands for a destination color code.

CPU 1 creates command codes such as "10010000" according to the above-mentioned command codes and logical operation codes, and sets them in the command register 46 (register #46).

When the source area exists within VRAM 4 and the destination area also exists within VRAM 4, the higher 4 bits of the above-mentioned command code provides an instruction to transfer the block data present within VRAM 4. Also, the lower 4 bits of the above-mentioned example provide a logical operation code, and "0000" provides a code to indicate that the color code data of the source area, as it is, is that of the destination area.

On receiving a command code from CPU 1, the video CPU 47 sets the command executing (CE) of the bit 7 of SR register 48 and starts to perform execution processings for the command.

Under control of the video CPU 47, SXY Address composing Circuit 40 is operated to create the physical address of VRAM 4 from SX register/counter 38 and SY register/counter 39 which respectively hold the source coordinates, and, in accordance with the thus created physical address, a color code data is read out from VRAM 4. The read-out color code data is forwarded through Data Line 54, Buffer 53, and VRAM Data Bus 35 and is then set in S register 34.

Next, DXY Address composing Circuit 57 is operated to create the physical address of VRAM 4 from the outputs of DX register/counter 58 and DY register/counter 59 which hold the destination coordinates respectively, and the thus created address is outputted through VRAM Address Bus 36 and Buffer 55 to VRAM 4 Address Line 56.

On the other hand, the color code data within S Register 34 that is read out on the source side is output via ALU 51, VRAM Data Bus 35 and Buffer 53 onto VRAM Data Line 54 and is then written into VRAM 4.

The above-mentioned operations complete the data transfer of 1 bit information.

On completion of transfer of the 1 dot information, the video CPU 47 counts up NX counter 64. Since "0" is being set in Direction X Flat 60, the counter sections of SX register/counter 38 and DX register/counter 58 are counted up. On the contrary, if "1" is set in Direction X Flag 60, then such counter sections are counted down. Then, the new contents of SX register/counter 38 and DX register/counter 58 are used to execute transfer of the next 1 dot information in the procedure as mentioned above. For each transfer of a series of such 1 dot information, the contents of NX Counter 64 and NX Register 61 are compared by a comparison circuit 66, and, if they coincide with each other, the data transfer is repeated in the same procedure as mentioned above.

In other words, if the contents of NX Register 61 and NX Counter 64 coincide with each other, the following operations (1)–(5) are then performed:

(1) NX counter 64 is cleared.

(2) Initial parameters set in the register section of SX register/counter 38 are set in the counter section thereof.

(3) Initial parameters set in the register section of DX register/counter 58 are set in the counter section thereof.

(4) NY counter 65 is counted up.

(5) Since "0" is set in Direction Y Flag, the counter sections of SY register/counter 39 and DY register/counter 59 are counted up, respectively.

Thus, using the new contents of SX, SY, DX, and DY registers/counters, the data transfer is continued in the same procedure.

If the contents of NX register 61 and NX counter 64 coincide with each other and if, after comparison of the contents of NY register 63 and NY counter 65 by Compare Circuit 67, they are found to coincide with each other, then the total (NX×NY) including NX in the X-coordinate direction and NY in the Y-coordinate direction of block data are to be transferred.

When the video CPU 47 detects the coincidence of the contents of NY register 63 and NY counter 65 as well as the coincidence of the contents of NX register 61 and NX counter 64, then it decides that the block data transfer has been completed, clears the command executing (CE) bit of SR Register 48, and informs CUP 1 of the completion of the block data transfer.

In the foregoing explanation, the transfer of the block data using the X, Y coordinates within VRAM 4 has been referred to. At the same time, the transfer of the block data from CPU 1 to VRAM 4, from VRAM 4 to CPU 1, and from Display Control Circuit 3 to VRAM 4 is similarly possible. We will discuss these cases below.

(1) Transfer of Block Data from CPU 1 to VRAM 4

In this case, since the source is CPU 1, Color Code Register 33 is used without using SX register/counter 38, SY register/counter 39 and S Register 34.

CPU 1 sets transfer data in Color Code Register 33, and Video CPU 47 writes the transfer data of Color Code Register 33 into VRAM 4 in accordance with DX register/counter 58 and DY register/counter 59. As a result of this, the transfer ready (TR) bit of SR Register 48 is set, and CPU 1 is informed that the transfer of the initial data has been completed and that the system is now ready for receipt of the next data.

After it confirms that the TR bit is "1", CPU 1 sets the next transfer data in Color Code Register 33. This resets the TR bit to return to its original state. Other operations are performed in a similar manner to the transfer of the block data within VRAM 4 to which we have referred before.

(2) Transfer of Block Data from VRAM 4 to CPU 1

In this case, since the destination is CPU 1, DX register/counter 58, DY register/counter 59 and S Register are not used and instead of them Color Code Register 33 is employed.

Video CPU 47 reads out the transfer data from VRAM 4 in accordance with SX register/counter 38 and SY register/counter 39, sets the transfer data in Color Code Register 33, and sets the TR bit of SR Register 48 for "1". CPU 1 checks the TR bit, and, if the TR bit is found to be "1", it reads out the transfer data from Color Code Register 33. As a result of this, the TR bit is reset and returns to its original state. Other operations are carried out in the same manner as in the transfer of the block data within VRAM 4.

(3) Transfer of Block Data from Display Control Circuit 3 to VRAM 4

This is a case wherein the block data written into Color Code Register 33 is to be transferred to the destination area of VRAM 4. This method is effective in writing the same data. The operational procedure is similar to the transfer of the block data from CPU 1 to VRAM 4. However, CPU 1 has only to write the block data into Color Code Register 33 once, and the block data is transferred under control of Video CPU 47.

The present invention not only can perform display control operations relative to CRT, but also is effective to other display units such as LCD, Plasma, and EL.

Next, we will describe the operation of the line command.

Figure 6A:
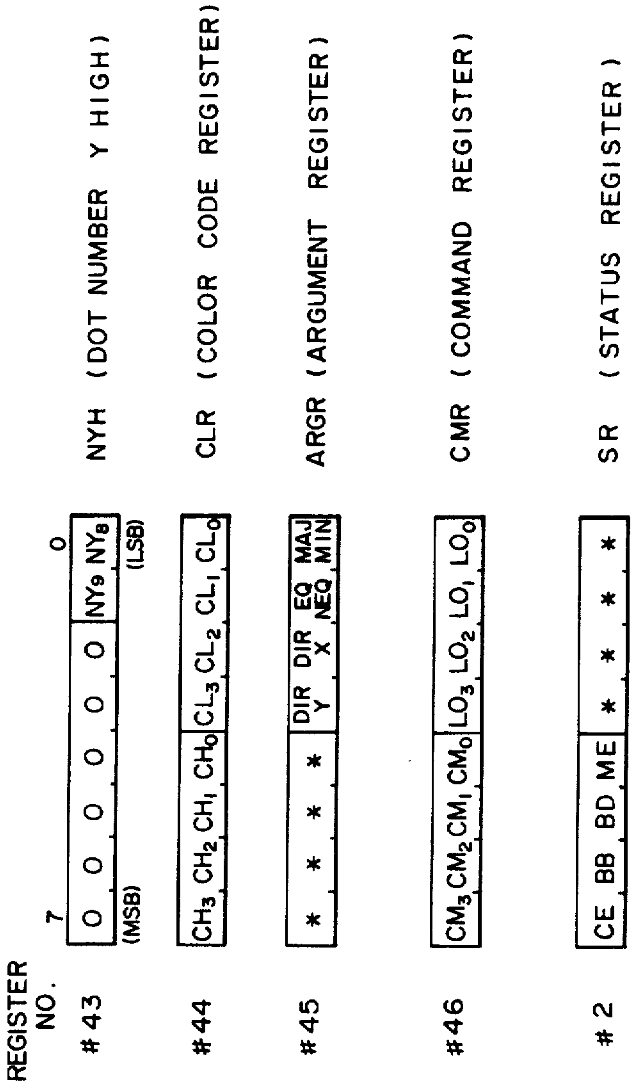

It is necessary that CPU 1 has previously set information required for execution of the line command in each of the registers of Display Control Circuit 3. When accessing each of the registers shown in FIG. 5 and 6A, CPU 1 sets the number of the register to be accessed in Register Pointer 44 before it performs its read/write operations.

CPU 1 sets the start coordinates (DXo, DYo) of a straight line to be formed in DX register/counter 58 and DY register/counter 59. DX register/counter 58 is composed of DXL (register #36) and DXH (register #37) respectively shown in FIG. 5, while DY register/counter 29 is composed of DYL (register #38) and DYH (register #39) respectively shown in FIG. 5 as well.

Also, NX, i.e., the amount of displacement from the start coordinates (DXo, DYo) in a horizontal direction (X-coordinate direction) is set in NX Register 61, while NY, i.e., the amount of displacement from the start coordinates (DXo, DYo) in a vertical direction (Y-coordinate direction) is set in NY Register 63.

Figure 3A:
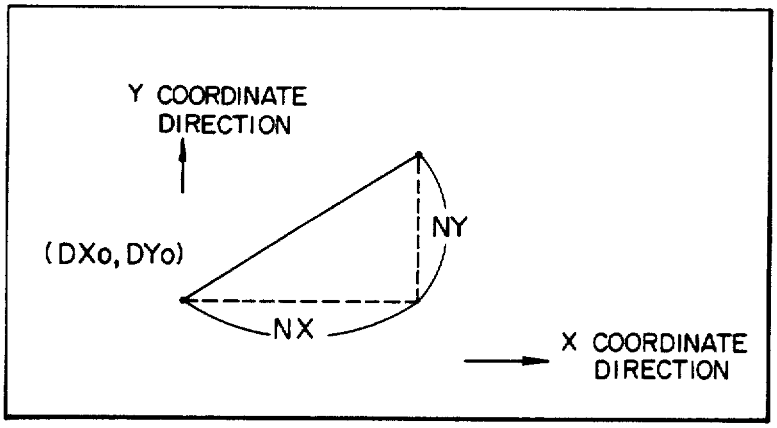
FIG. 3A is a view to explain the execution of a line command employed in the display system shown in FIG. 1.

As illustrated in FIG. 3A, since the above-mentioned line is positive in both of X, Y directions when viewed from the start coordinates (DXo, DYo), Direction X Flag 60 and Direction Y Flag 62 are set for "0". This direction X flag 60 corresponds to the bit 2 of Argument Register (Register #46) and the direction Y flag 62 corresponds to the bit 3 of Argument Register (Register #46). Then, the operation of the color code on the screen is performed, and the given data used to create the color code data for the line is set in Color Code Register 33. This color code register 33 corresponds to CLR (Register #44) illustrated in FIG. 6A.

CPU 1 creates a command code of "011100111" according to the command code table in FIG. 7 and the logical operation code table in FIG. 8, and sets it in Command Register 46 (Register #45). The higher 4 bits of this command code, "0111" indicate that they are a line command, while the lower 4 bits thereof "0011" indicate that they are a logical operation code, or an exclusive OR.

On receiving the command code and the logical operation code from CPU 1, Video CPU 47 sets the command executing ("CE" of Register #2 shown in FIG. 6A) of the bit 7 of SR Register 48, and starts the execution and processing of the command.

Next, Video CPU 47 reads out the color code that is created by DXY Address composing Circuit 57 from DX register counter 58 and DY register/counter 59 which respectively hold the line coordinates, and sets the read-out color code in D Register 52.

ALU (Arithmetic and Logic Unit) 51 is operated to execute a logical operation (an exclusive OR) on the data within Color Code Register 33 set by CPU 1 and the color code data in D Register 52 read out from the area where the line is to be formed. As a result of this, the color code data to form the line is created.

The newly operated and created color code data is output on VRAM Data Line 52 via VRAM Data Bus 35 and Buffer 53, and is then written into VRAM 4 in accordance with the physical address on the side of the area where the line is to be formed, that is, the physical address created by DXY Address composing Circuit 57.

The above-mentioned operations complete forming of the 1 dot in the above-mentioned straight line.

Video CPU 47 performs a coordinate calculation based on the coordinates represented by the contents of DX register/counter 58 and DY register/counter 59 as well as on the displacement amount/direction expressed by the contents of NX Register 61 and NY Register 63 so as to find out the coordinates (DX1, DY1) of the second dot in the above-mentioned straight line. At the same time, in accordance with the above-mentioned coordinate calculation, NX Counter 64 and NY Counter 65 are counted up by the amount of displacement up to the second dot. Here, it should be noted that NX Counter 64 and NY Counter 65 have been cleared by Video CPU 47 at the time when the line command is started.

The coordinates (DX1, DY1) of the second dot are again set in DX Register/Counter 58 and DY Register/Counter 59, and the picture-forming of the second dot is executed in the same procedure as mentioned above.

On detecting the coincidence of the contents of NX Register 61 and NX Counter 64 as well as the coincidence of the contents of NY Register 63 and NY Counter 65, Video CPU 47 decides that the line command has been completed, clears the command executing (CE) bit of SR Register 48, and informs CPU 1 of the completion of the command.

Figure 9:
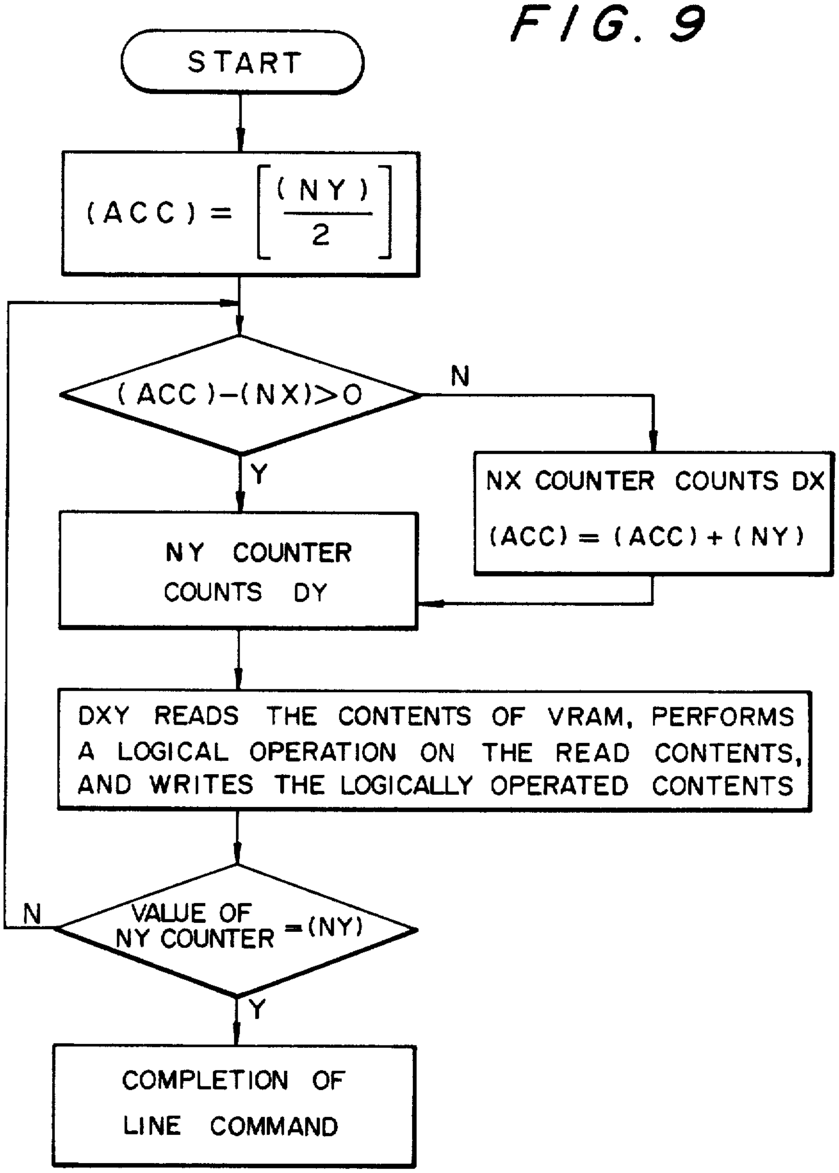
FIG. 9 is a flow chart to illustrate the algorithm for execution of the line command employed in the invention.

Now, we will described in detail the algorithm of the above-mentioned straight line with reference to FIG. 9.

First, let (NY) be the value of NY Register, let (NX) be the value of NX Register, and let (NY)>(NX). An operation register in Video CPU is called ACC and the value of ACC is represented by (ACC). By counting NX Counter, DX Counter, NY Counter and DY Counter in accordance with the method shown in the flow chart of FIG. 9, DXY can trace the physical addresses of the straight line sequentially.

The counting direction, that is, count-down or count-up of DX Counter and DY Counter depends upon the values of DIRX and DIRY.

In case of (NY)<(NX), the above-mentioned NY and NX are replaced with each other, and DX and DY are replaced with each other. As a result of this, the straight line can be traced with the X coordinate direction as the main axis.

By way of the above-mentioned processings, CPU 1 can execute its straight line forming processings without any further burden only by outputting the line command. Therefore, the time necessary for the line forming processings can be greatly reduced, compared to the prior art technique.

As discussed hereinbefore, in the present invention, since most of the processing time of software on display operation can be shared by hardware, the display memory access can be speeded up with a comparatively smaller quantity of increase of the hardware required. The invention is also effective in a system in which a display memory is separated from a main memory. It is obvious to those skilled in the art that this effect can be applied to the data transfer on the main memory.

What is claimed is:

1. A data transfer control system for data transfer between data areas included in a memory unit for logically forming a display plane, comprising:
   - means for specifying a start point of transfer in a source area;
   - means for specifying a beginning point of transfer into a destination area;
   - means for holding amounts of data in a horizontal direction to be transferred;
   - means for holding amounts of data in a vertical direction to be transferred;
   - means for holding data which changes an order of position where the data in said source area is read out in either the left or the right direction; and
   - means for holding data which changes an order of position where the data in said source area is read out in either an up or a down direction;

characterized in that said data transfer between areas is executed by reading out data in said source area specified by means for specifying a start point of transfer in a source area, for holding amounts of data in a horizontal direction to be transferred, for holding amounts of data in a vertical direction to be transferred and for holding data which changes the order of position from said memory unit and writing said read-out sequentially into said destination area so that when said source area is set in a main memory and said destination area is set in VRAM, a CPU writes into a predetermined data register and the content written into said predetermined data register is ready out by a video CPU to perform a data transfer, and when said destination area is set in said main memory and said source area is set in VRAM, said video CPU writes into said predetermined data register and the contents of said predetermined data register are read out by said CPU to perform a data transfer.

2. A data transfer control system as set forth in claim 1, characterized in that said memory unit is a display memory.

3. A data transfer control system as set forth in claim 1 or 2, characterized in that said source area and destination area is expressed by values on X, Y coordinates.

4. A data transfer control system for data transfer between data areas as set forth in claim 1, characterized in that a register pointer for designating a plurality of registers comprises a counting function provided in each of said means for specifying a start point of transfer in a source area, or specifying a beginning point of transfer into a destination area, for holding amounts of data in a horizontal direction to be transferred, for holding amounts of data in a vertical direction to be transferred, for holding data which changes the order of position where the data in said source area is read out in either the left or the right direction and for holding data which changes the order of position when the data in said source is read out in either an up or down position and said register pointer is capable of performing a successive setting.

5. A data transfer control system for data transfer between data areas as set forth in claim 1, characterized in that said system comprises:
   - a means for holding information for designating whether read out data in said source area is read out toward the left or right direction;

a means for holding information for designating whether the read out data in said source area is read out in an up or down direction; and a direction setting means for setting a direction wherein data in said source area is not rewritten before transmission of data in said source area to said destination area is completed when said source area and said destination area partially overlap each other.

* * * * *